(12) United States Patent
Lin

(10) Patent No.: US 6,739,283 B1
(45) Date of Patent: May 25, 2004

(54) WATER DISPENSER FOR SMALL ANIMALS OR PETS

(76) Inventor: Jun Hui Lin, PO Box 82-144, Taipei (TW)

( * ) Notice: Subject to any disclaimer, the term of this patent is extended or adjusted under 35 U.S.C. 154(b) by 0 days.

(21) Appl. No.: 10/414,102

(22) Filed: Apr. 16, 2003

(51) Int. Cl.[7] .......................... A01K 7/00; A01K 39/02
(52) U.S. Cl. ...................................... 119/72.5; 119/464
(58) Field of Search .................... 119/72.5, 74, 75, 119/81, 464

(56) References Cited

U.S. PATENT DOCUMENTS

| | | | | | |
|---|---|---|---|---|---|
| 3,581,713 | A | * | 6/1971 | Crooks .......................... 119/2.5 |
| D226,097 | S | * | 1/1973 | Robert .......................... 119/464 |
| 4,370,948 | A | * | 2/1983 | Atkins .......................... 119/72.5 |
| 5,003,922 | A | * | 4/1991 | Niki et al. ................. 119/72.5 |
| 6,339,998 | B1 | * | 1/2002 | Niki et al. ................. 119/72.5 |
| 6,561,129 | B1 | * | 5/2003 | Cheng .......................... 119/72.5 |

* cited by examiner

*Primary Examiner*—Charles T. Jordan
*Assistant Examiner*—Elizabeth Shaw
(74) *Attorney, Agent, or Firm*—Leong C. Lei

(57) ABSTRACT

A water dispenser for small animals or pets is disclosed. The dispenser comprises a base seat, a pad body, a trigger rod, a rim pad, a press tube and a clip. The trigger rod is slanting, and a gap is formed between the rim bottom and the pad which allows water to flow for drinking by any small animal kept in a cage.

4 Claims, 6 Drawing Sheets

WATER DISPENSER FOR SMALL ANIMALS OR PETS

BACKGROUND OF THE INVENTION (a) Technical Field of the Invention

The present invention relates to a water dispenser structure, and in particular, a water dispenser which can self-dispense water to animals or pets kept within a cage or the like. The water dispenser is easily mounted at the exterior of the cage keeping the animals.

(b) Description of the Prior Art

FIG. 1 is a conventional water dispenser for pets such as dogs, cats or birds. The dispenser comprises a water container 1 which contains a limited supply of water. In application, the water 2 has to be constantly added to the dispenser. It is common for people to be too busy to add water 2 or to forget to add water 2 for the small animal 4. Occasionally, one of the dispensers may not fill with sufficient water 2 and the animals may die. To add water to all dispensers of the cage 3 is laborious and time consuming. This is very inconvenient. Accordingly, it is an object of the present invention to provide a water dispenser for small animal which mitigates the shortcomings of the conventional water dispenser for animals.

SUMMARY OF THE INVENTION

Accordingly, it is an object of the present invention to provide a water for small animals or pets comprising a base seat, a pad body, a trigger rod, a rim pad, a press tube, and a clip, characterized in that the clip, further comprises a front clip board, a rear clip board and an upper mounting, the base seat is hollow and is provided with external threads, one side of the base seat is provided with an engaging head for connection to a tube connected to a water supply, and the other side of the base seat is a recess section being provided with inner threads, the pad body is positioned within the recess section and the pad body is provided with at least a through hole, the upper end and the side of the base seat external threads and is engaged with the protrude edge of the press tube, which is screwed to the base seat to form as a unit, the protruded edge and the recess section of the base seat are sealed, the press tube is hollow and has a notch at one end, and the other end of the tube is provided with external threads and the protruded edge is provided with a protruded seat having a rim pad, the trigger rod is installed on the center of the press tube, one end of the trigger tube is provided with a ring bottom which is sealed respectively with the pad body and the rim bottom to stop the flow of water, whereby, if the trigger rod is slanting, a gap is formed between the in bottom and the pad which allows water to flow to be drunk by any small animal kept in a cage.

Yet another further object of the present invention is to provide a water dispenser for small animals or pets which dispenses water automatically and is conveniently operated. The dispenser saves time and it is not laborious to add water into the dispenser and thus, the dispenser subsequently reduces the fatality of the small animals kept in a cage.

A further object of the present invention is to provide a water dispenser for small animals or pets, wherein the dispenser is clip at the exterior of the cage, facilitating adjustment and supplying of water.

The foregoing object and summary provide only a brief introduction to the preset invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numeral refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
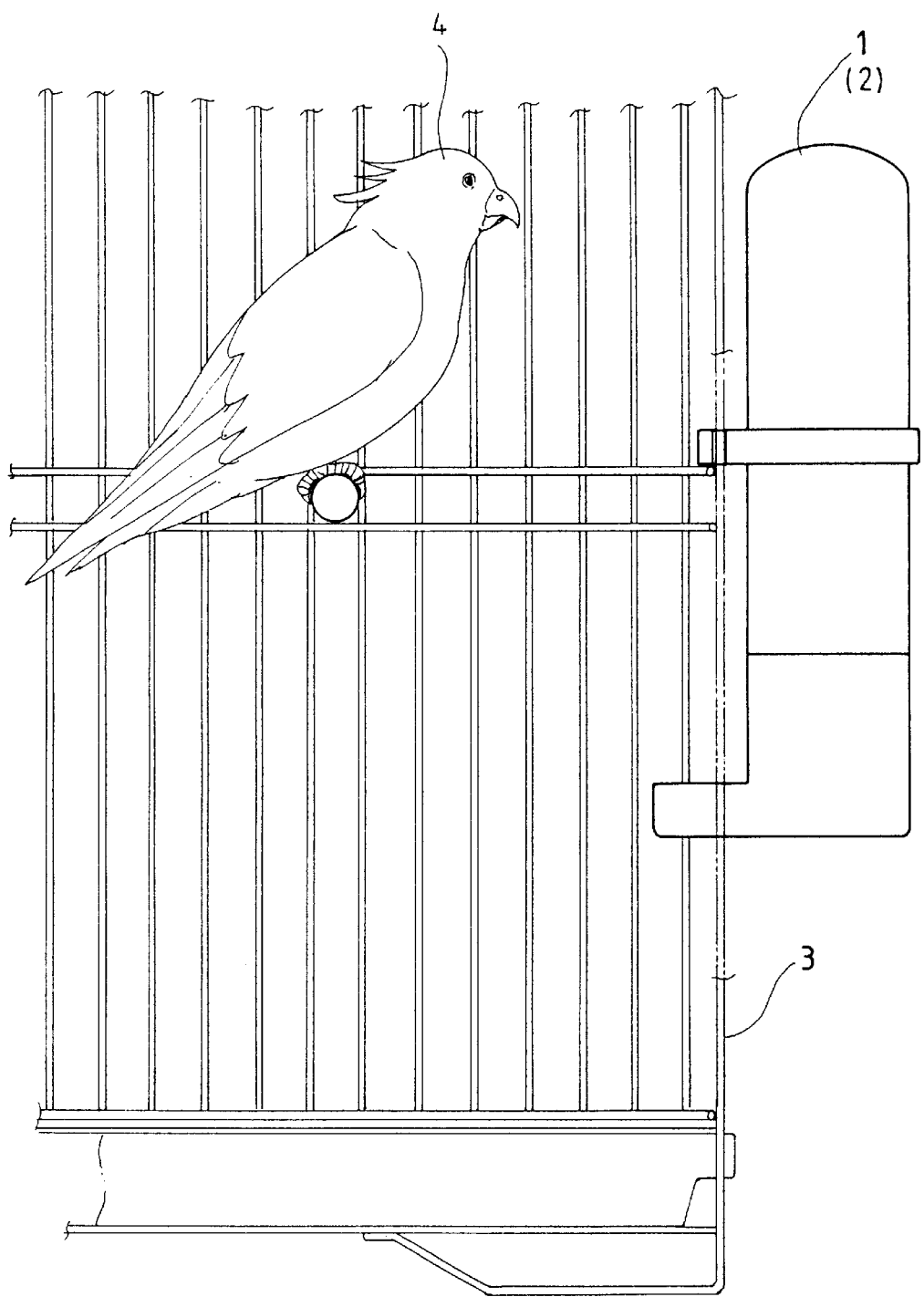
FIG. 1 is a schematic view of a conventional water dispenser mounted at the external of the cage keeping the small animal.
Figure 2:
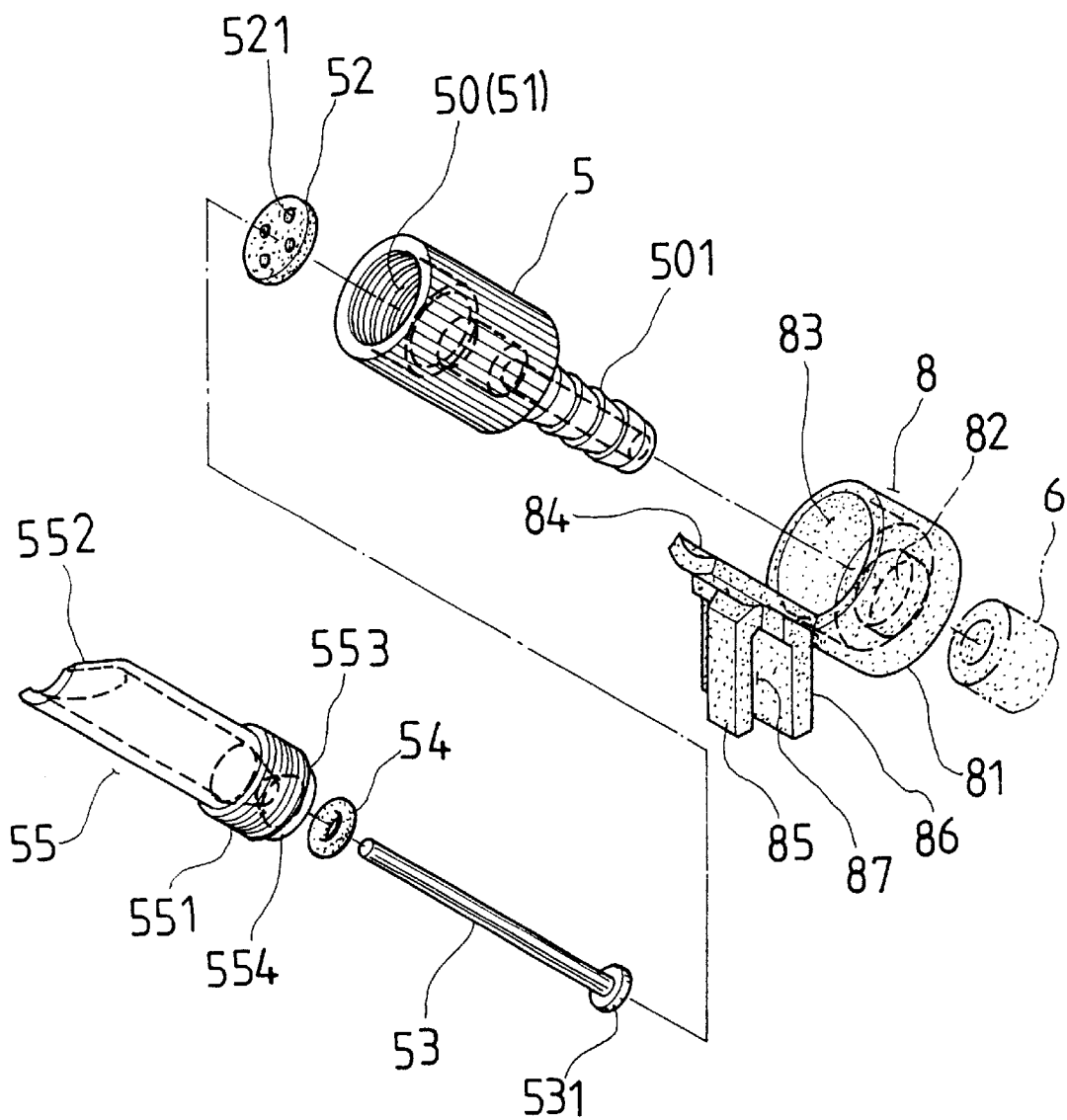
FIG. 2 is a perspective exploded view of a water dispenser in accordance with the present invention.
Figures 3, 3A:
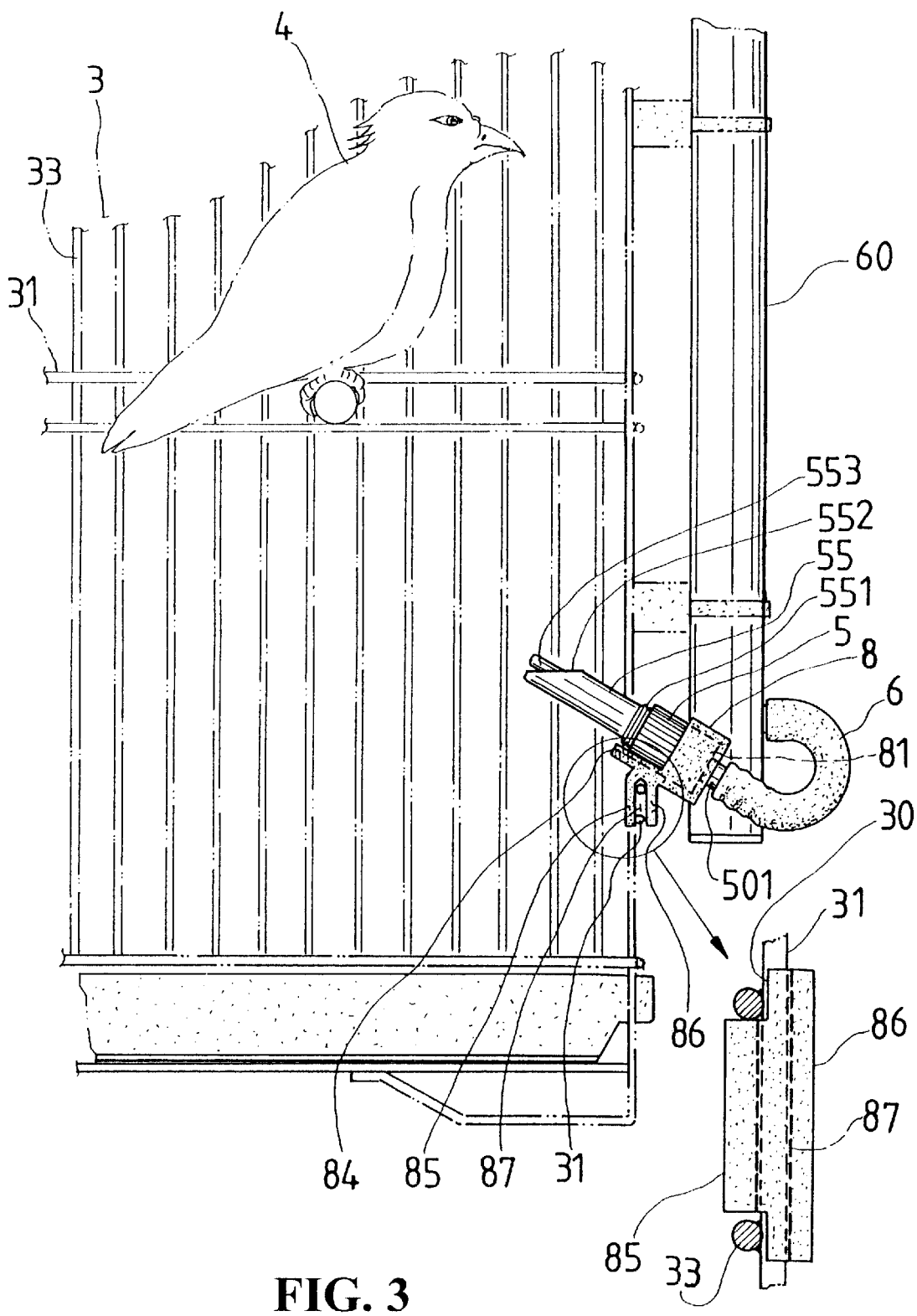
FIG. 3 is a side elevation view showing the mounting of the water dispenser of the present invention to the cage keeping the animal.
FIG. 3A is a sectional view showing the mounting of the water dispenser to the wire of the cage.
Figure 4:
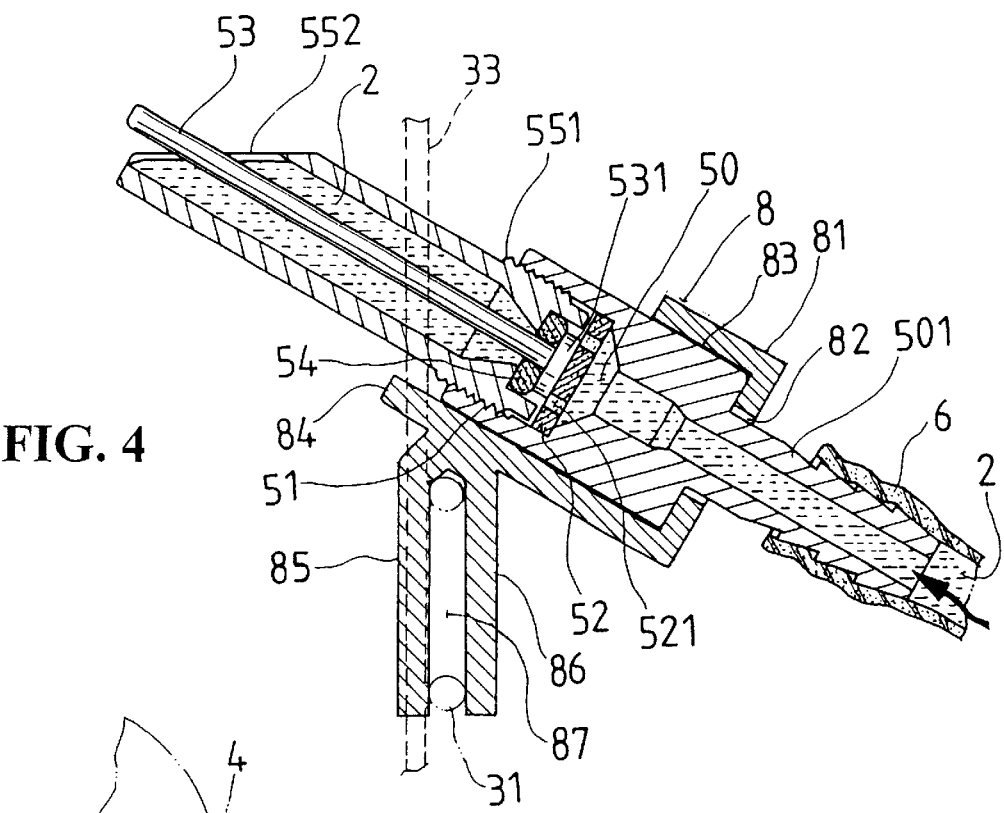
FIG. 4 is a sectional view of the water dispenser of the present invention.

Referring to FIGS. 2, 3, 3-A, 4 and 5, there is shown a water dispenser for animals or pets comprising a base seat 5, a pad body 52, a trigger rod 53, a rim pad 54, a press tube 55, and a clip 8. The clip 8 includes a front clip board 85, a rear clip board 86, and an upper mounting 81. The base seat 5 is a hollow structure with external and has an engaging head 501 for connection with a tube 6 connected to the water supply. The other end of the base seat 5 is a recess section 50 having internal threads 51. There is a pad body 52 having four through holes 521 and the engaging head 501 which is corrected to the tube 6 will not allow rapid oxidation of the contained water 2. Therefore, the water 2 will not produce fungi or the like. The four holes 521 allow water to pass through. The press tube 55 connected to the base seat 5 has a notch 552 to allow the small animal to have access to the water 2. The upper end of the press tube 55 is provided with external threads 551 for connection with the inner threads 51 at the recess section 50 of the base seat 5. The lower section of the external thread 551 is provided with a protruded edge 554 to urge one side of the surrounding of the pad body 52 so that water 2 will not leak via the connection between the base seat 5 and the press tube 55. In order to allow the small animal 4 to control water flow, a recess seat 553 is provided at the protruded edge 554 and at the external thread 551. The recess seat 553 is mounted with a rim pad 54 mounted on top being the trigger rod 53 having a rim bottom 531. The trigger rod 53 passes through the press tube 55 and is protruded at the notch 552. The rim bottom 531 is located between the rim pad 54 and a pad body 52 to allow water 2 to flow or to stop water from flowing, as shown in FIG. 4.

Figure 5:
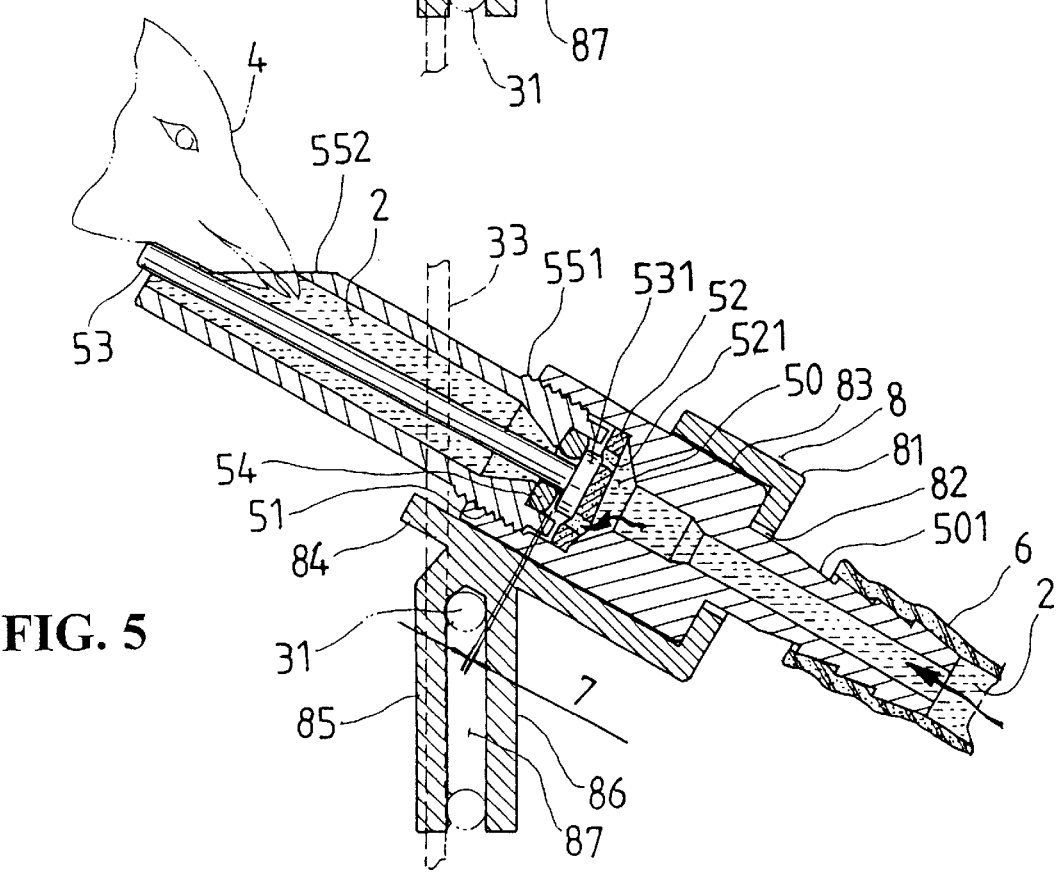
FIG. 5 is a sectional view of the water dispenser of the present invention, showing a bird drinking water.

Water will flow out from the four holes 521 when water 2 goes through the tube 6. The rim bottom 531 of the trigger rod 53 urges the rim pad 54 and thus water is sealed at the rim pad 54. In order to allow water 2 to be ret at the press tube 55, the notch 552 is facing upward. As shown in FIG. 5, for a bird, the beak of a bird will touch the trigger rod 53. This will cause the rim bottom 531 to flatly seal the trigger rod 53 to form a gap 7. Water will flow via the gap 7. The water 2 is supplied automatically to the bird, for instance. When the small animal 4 moves away from the press tube, the rim bottom 531 of the trigger rod 53 will seal the gap 7 and water will stop (as shown in FIG. 4).

In order to install the dispenser of the present invention onto the wire 31 of the cage 3, the external of the base seat 85 is provided with a clip 8. The front clip board 85 is located in front of the rear clip board 86. The width of the front clip board 85 is smaller than that of the rear clip board 86, allowing the clip 8 to be easily mounted to the cage 3. The mounting section 87 formed by the two clip boards 86, 85 can sit on the wire 31 of the cage 3.

The center of the upper mounting 81 has a cavity 83 and a through hole 82 at the rear section thereof. The front section, i.e., the bottom section of the cavity 83 is extended to form an arch-shaped protruded block 84 to stop the engagement of the of the base seat 5. The through hole 82 allows the mounting of the engaging head 501. In combination, the base seat 5 with external threads fits to the cavity 83 of the upper mounting 81, and the engaging head 501 is extended out via the through hole 82 for the tube 6 to be inserted. The external thread at the base seat 5 will retain the cavity 83. The protruded block 84 provides adjustment of water dispensing to the animal and provides holding for the user. As shown in FIGS. 3 and 3-A, the rear clip board 86 is wider and forms as a blocking portion 30 so that the dispenser will not drop into the cage 3.

Figure 7:
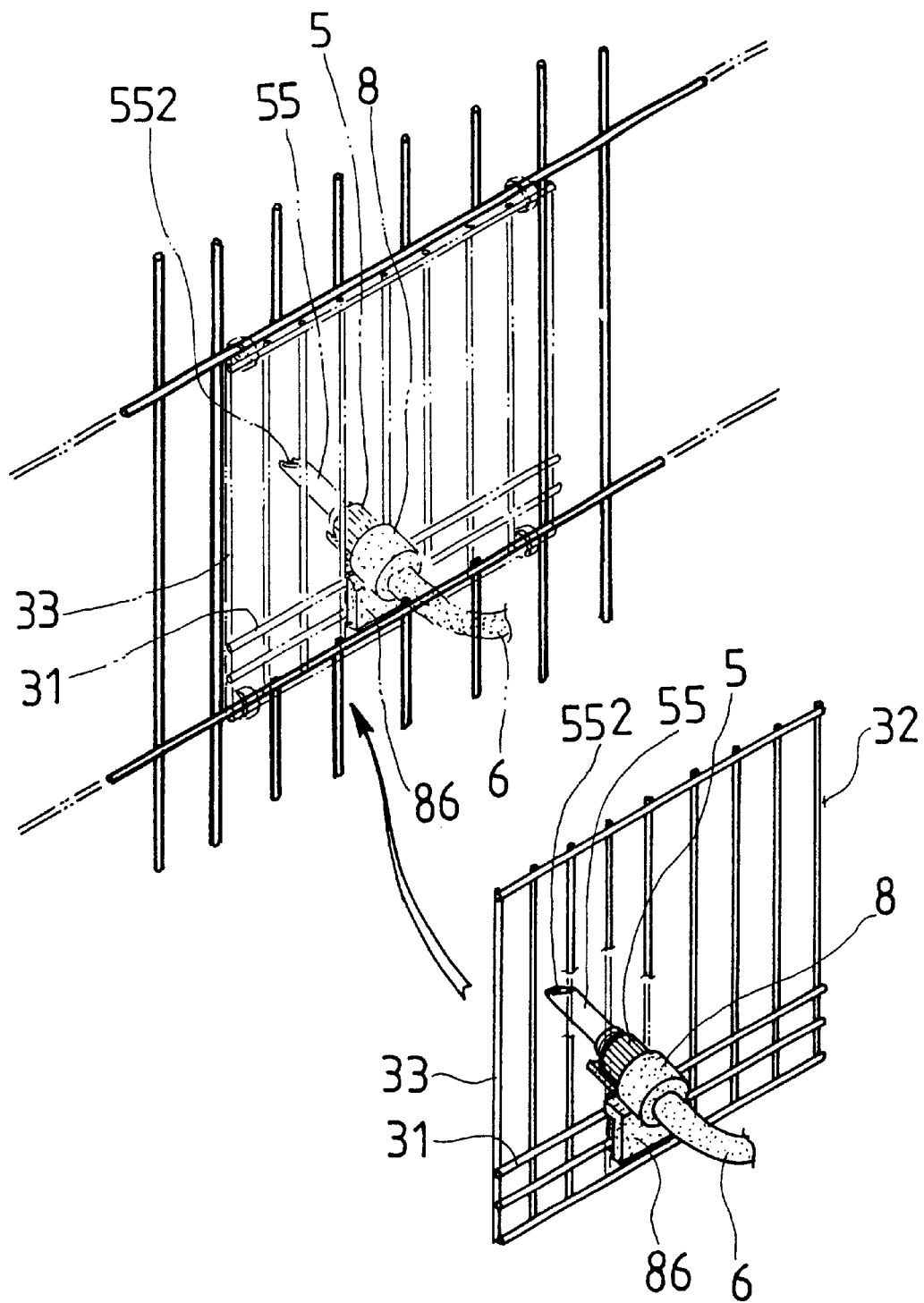
FIG. 7 is a schematic view showing the mounting of the water dispenser to the external net frame of the cage in accordance with the present invention.

As shown in FIG. 7, the dispenser can be mounted onto an external net frame 32 and is then fitted to the cage 3.

Figure 6:
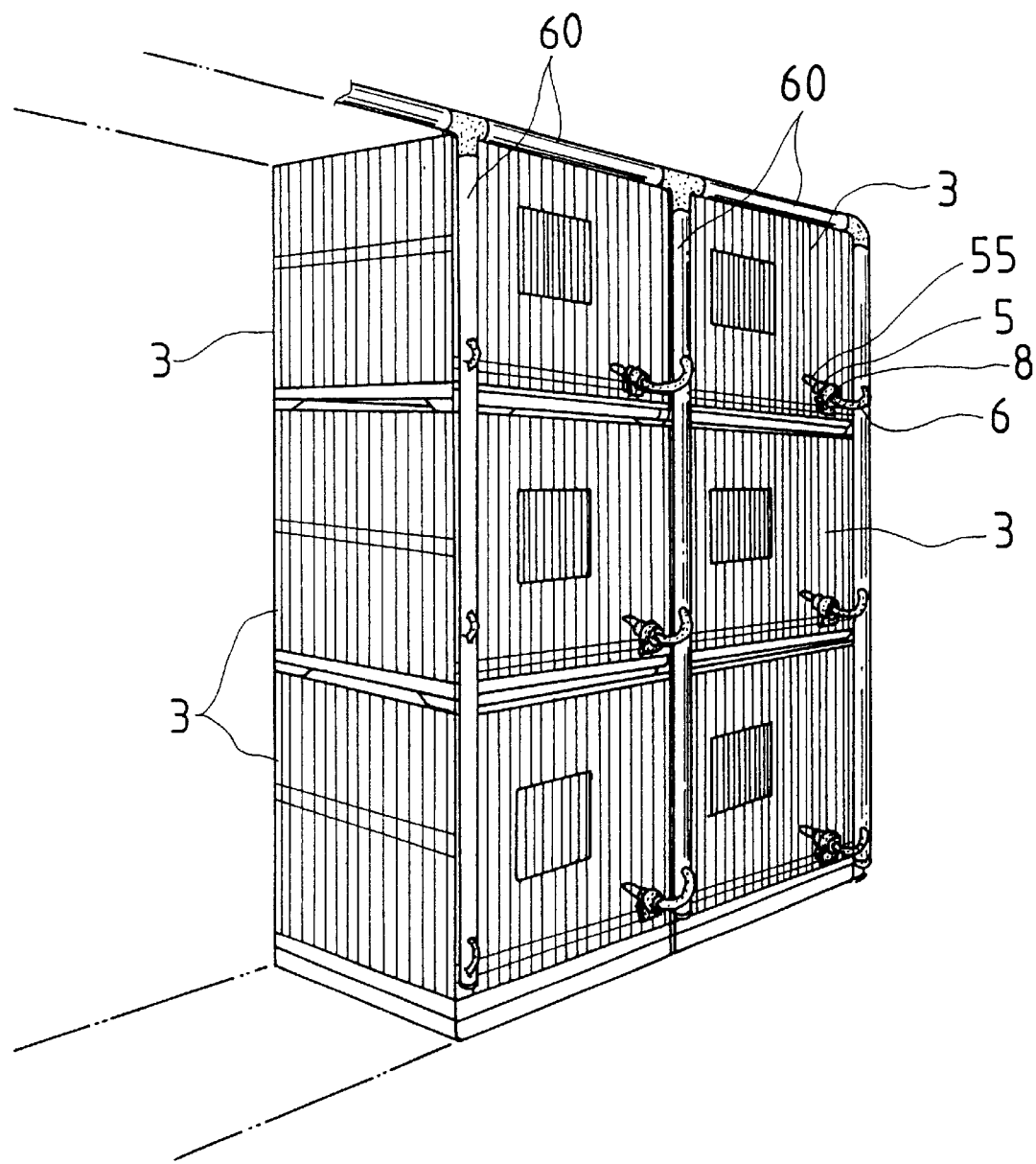
FIG. 6 is a schematic view of a cage mounted with a plurality of water dispensers in accordance with the present invention.

Referring to FIG. 3 and FIG. 6, the dispenser can be applied to multiple cages. When the animal 4 touches the trigger rod 53, water 2 will flow from the tube 6 from a water pipe 60 to the press tube 55, as shown in FIG. 6. For multiple cages, water 2 will be supplied by a water tank so that water will be supplied to the dispenser without stopping.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A water dispenser for small animals or pets comprising a base seat, a pad body, a trigger rod, a rim pad, a press tube, and a clip, characterized in that the clip further comprises a front clip board, a rear clip board and an upper mounting, the base seat is hollow and is provided with external threads, one side of the base seat is provided with an engaging head for connection to a tube connected to a water supply, and the other side of the base seat is a recess section having provided with inner threads, the pad body is positioned within the recess section and the pad body is provided with at least a through hole, the upper end and the external side of the base seat is with external threads and is engagement with the protruded edge of the press tube, which screwed to the base seat to form as a unit, the protruded edge and the recess section of the base seat are sealed, the press tube is hollow and has a notch at one end, and the other end of the tube is provided with external thread and the protruded edge is provided with a protruded seat having a rim pad, the trigger rod is installed on the center of the press tube, one end of the trigger tube is provided with a ring bottom which are sealed respectively with the pad body and the rim bottom to stop the flow of water, whereby, if the trigger rod is slanting, a gap is formed between the rim bottom and the pad which allows water to flow for the drinking of the small animal kept with cage.

2. The water dispenser of claim 1, wherein a mounting section is formed between the front clip board and the rear clip board, and the rear sides of the front and rear clip board are provided with an upper mounting having a cavity and a through hole for the securing of the base seat and the mounting of the engaging head at the rear end thereof.

3. The water dispenser of claim 1, wherein the clip is provided with a protruded block for the adjustment of the mounting of the base seat.

4. The water dispenser of claim 1, wherein the external end of the front and rear clip boards is provided with a sloping edge for the engagement of the wire of the cage.

* * * * *